US012724359B2

(12) United States Patent
Nagamori et al.

(10) Patent No.: US 12,724,359 B2
(45) Date of Patent: Sep. 1, 2026

(54) CHARGING DEVICE, TONER-IMAGE FORMING UNIT, AND IMAGE FORMING APPARATUS

(71) Applicant: FUJIFILM Business Innovation Corp., Tokyo (JP)

(72) Inventors: Yuki Nagamori, Kanagawa (JP); Go Miura, Kanagawa (JP); Hirotaka Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/302,198

(22) Filed: Apr. 18, 2023

(65) Prior Publication Data

US 2024/0168401 A1 May 23, 2024

(30) Foreign Application Priority Data

Nov. 17, 2022 (JP) ................................ 2022-184342

(51) Int. Cl.
*G03G 15/02* (2006.01)

(52) U.S. Cl.
CPC ..... *G03G 15/0258* (2013.01); *G03G 15/0283* (2013.01)

(58) Field of Classification Search
CPC ........... G03G 15/0258; G03G 15/0283; G03G 15/0291
See application file for complete search history.

(56) References Cited

U.S. PATENT DOCUMENTS 6,389,260 B1 * 5/2002 Kataoka ............. G03G 15/0194 399/302
2009/0304410 A1 * 12/2009 Tanaka ............... G03G 15/0258 399/100
2012/0230722 A1 * 9/2012 Tanaka ............... G03G 15/0291 399/100
2013/0094878 A1 * 4/2013 Ueno ................. G03G 15/0291 399/100

FOREIGN PATENT DOCUMENTS

JP H06-266205 A 9/1994
JP 3269697 B2 3/2002
JP 2003-015388 A 1/2003

* cited by examiner

*Primary Examiner* — Sandra Brase
(74) *Attorney, Agent, or Firm* — Oliff PLC

(57) ABSTRACT

A charging device includes: a housing having a U-shaped cross-section, disposed such that an opening thereof faces a surface of a rotating image carrier, and extending in an axial direction of the image carrier; a discharge electrode configured to charge the surface, the discharge electrode being attached to the housing, inside the housing, and extending in the axial direction; and a cleaner having a protrusion that comes into contact with a bottom plate of the housing and configured to move in the axial direction to clean the discharge electrode in a state in which the protrusion is in contact with the bottom plate, regardless of whether the opening in the housing faces upward or downward.

20 Claims, 10 Drawing Sheets

CHARGING DEVICE, TONER-IMAGE FORMING UNIT, AND IMAGE FORMING APPARATUS

CROSS-REFERENCE TO RELATED APPLICATIONS

This application is based on and claims priority under 35 USC 119 from Japanese Patent Application No. 2022-184342 filed Nov. 17, 2022.

(i) TECHNICAL FIELD

The present disclosure relates to a charging device, a toner-image forming unit, and an image forming apparatus.

(ii) RELATED ART

Japanese Unexamined Patent Application Publication No. 6-266205 discloses a discharge device including: a discharger having a shield case with an opening facing at least a discharging target, and a discharge electrode stretched in the shield case; and a voltage applying device for applying a voltage to the discharge electrode. The shield case has an opening provided in a part thereof, and a conductive member, which extends in the direction in which the discharge electrode is stretched, at least a surface of which is formed of a conductive material, and which is grounded directly or via a voltage generating device, is provided in the opening.

SUMMARY

Conventionally, a scorotron charging device for charging the surface of an image carrier is provided so as to face the image carrier. This charging device is disposed such that an opening in a housing of the charging device faces the surface of the image carrier. This charging device is provided with a cleaner for cleaning a discharge electrode. This cleaner moves in a direction in which the discharge electrode extends with respect to the housing to clean the discharge electrode.

The discharge electrode is directly or indirectly attached to the housing. Hence, it is necessary to suppress a change in the relative position between the moving cleaner and the housing in the direction in which the image carrier and the charging device face each other.

The charging device may be disposed above or below the image carrier due to the limitation by the layout of peripheral objects. In other words, the opening in the housing of the charging device may face upward or downward.

Aspects of non-limiting embodiments of the present disclosure relate to providing a charging device in which a cleaner can be positioned with respect to a housing regardless of whether an opening in the housing faces upward or downward.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to a first aspect of the present disclosure, there is provided a charging device including: a housing having a U-shaped cross-section, disposed such that an opening thereof faces a surface of a rotating image carrier, and extending in an axial direction of the image carrier; a discharge electrode configured to charge the surface, the discharge electrode being attached to the housing, inside the housing, and extending in the axial direction; and a cleaner having a protrusion that comes into contact with a bottom plate of the housing and configured to move in the axial direction to clean the discharge electrode in a state in which the protrusion is in contact with the bottom plate, regardless of whether the opening in the housing faces upward or downward.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
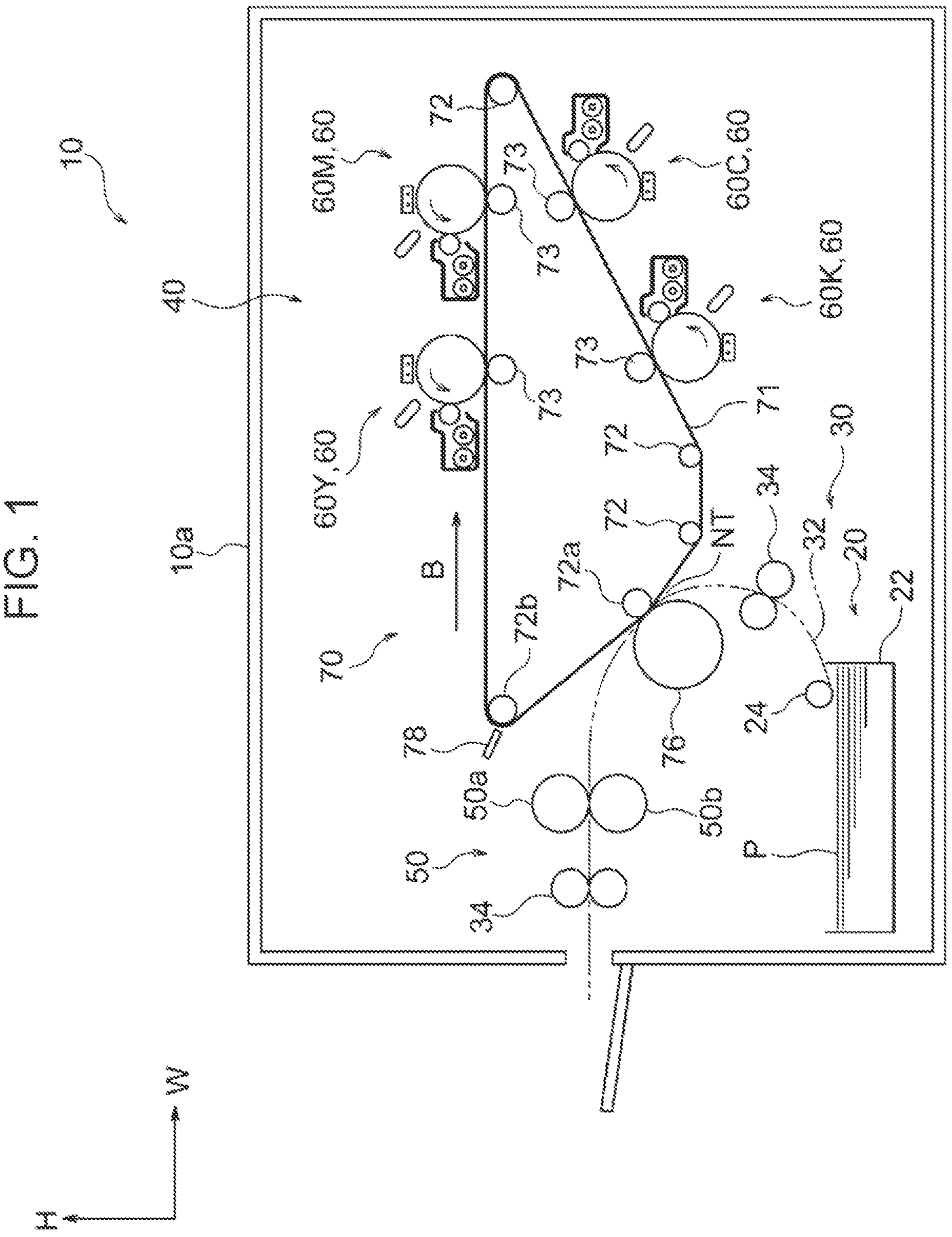
FIG. 1 schematically shows the configuration of an image forming apparatus according to a first exemplary embodiment of the present disclosure.

Examples of a charging device, a toner-image forming unit, and an image forming apparatus according to a first exemplary embodiment of the present disclosure will be described with reference to FIGS. 1 to 8. In the drawings, arrow H indicates the top-bottom direction of the apparatus (vertical direction), arrow W indicates the width direction of the apparatus (horizontal direction), and arrow D indicates the depth direction of the apparatus (horizontal direction).

Image Forming Apparatus

An image forming apparatus 10 according to this exemplary embodiment is an electrophotographic image forming apparatus that forms a toner image on a sheet member P, serving as a recording medium. As shown in FIG. 1, the image forming apparatus 10 includes a storage section 20, a transport section 30, an image forming section 40, and a fixing device 50.

Storage Section and Transport Section

The storage section 20 includes a storage member 22 that stores sheet members P, and a feed roller 24 that feeds the sheet members P stored in the storage member 22 to a sheet transport path 32. The transport section 30 includes multiple transport rollers 34 that transport the sheet members P along the transport path 32.

Image Forming Section

The image forming section 40 includes toner-image forming units 60 that form toner images, and a transfer device 70 that transfers the toner images formed by the toner-image forming units 60 to a sheet member P.

Toner-Image Forming Unit

The toner-image forming units 60 include toner-image forming units 60Y, 60M, 60C, and 60K corresponding to a total of four colors, namely, yellow (Y), magenta (M), cyan (C), and black (K). Note that alphabets at the ends of the reference signs may be omitted when Y, M, C, and K are not distinguished.

The toner-image forming units 60Y and 60M have basically the same structure except for the toners used. The toner-image forming units 60C and 60K have basically the same structure except for the toners used.

Figure 2:
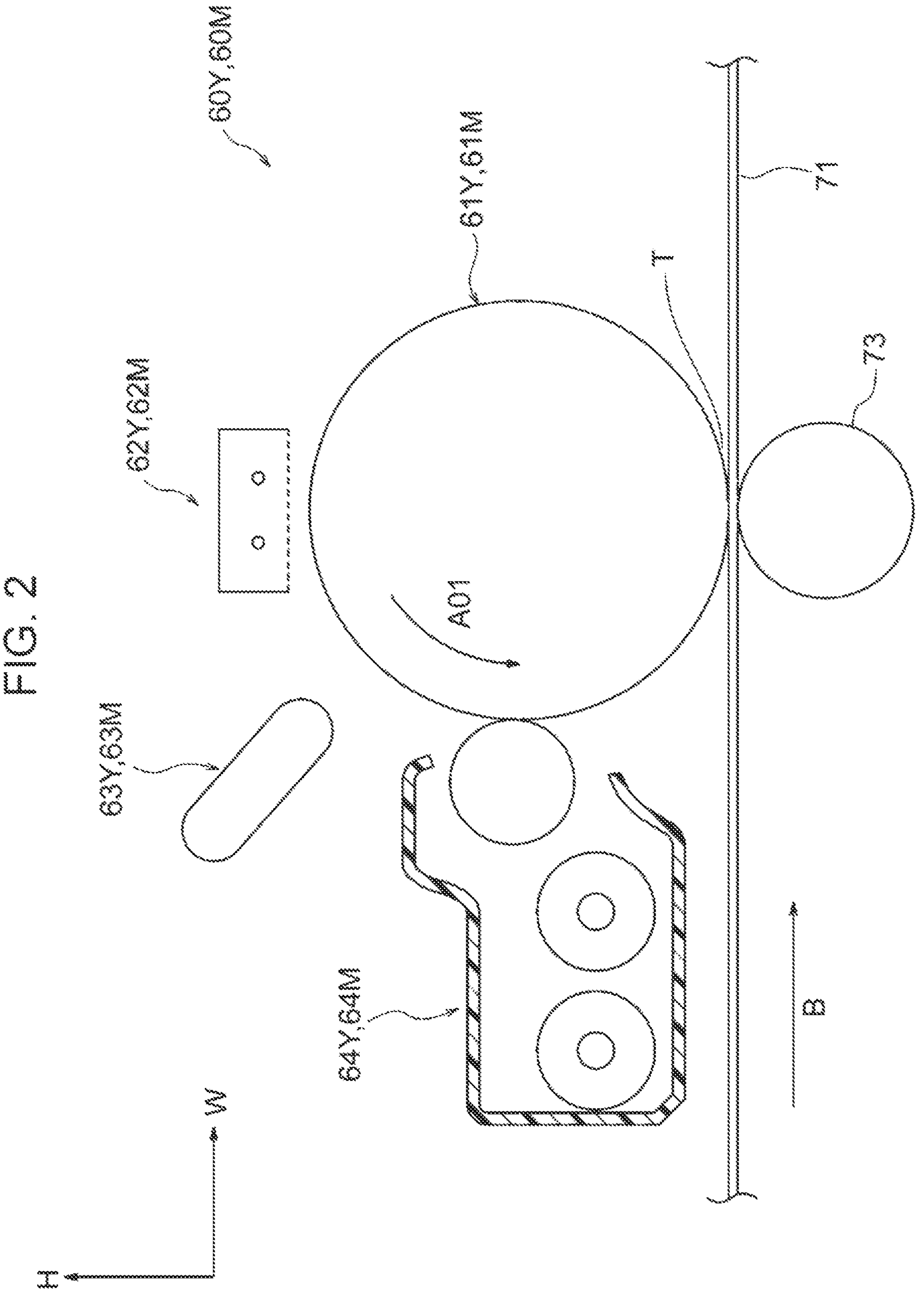
FIG. 2 schematically shows the configuration of a toner-image forming unit according to a first exemplary embodiment of the present disclosure.
Figure 3:
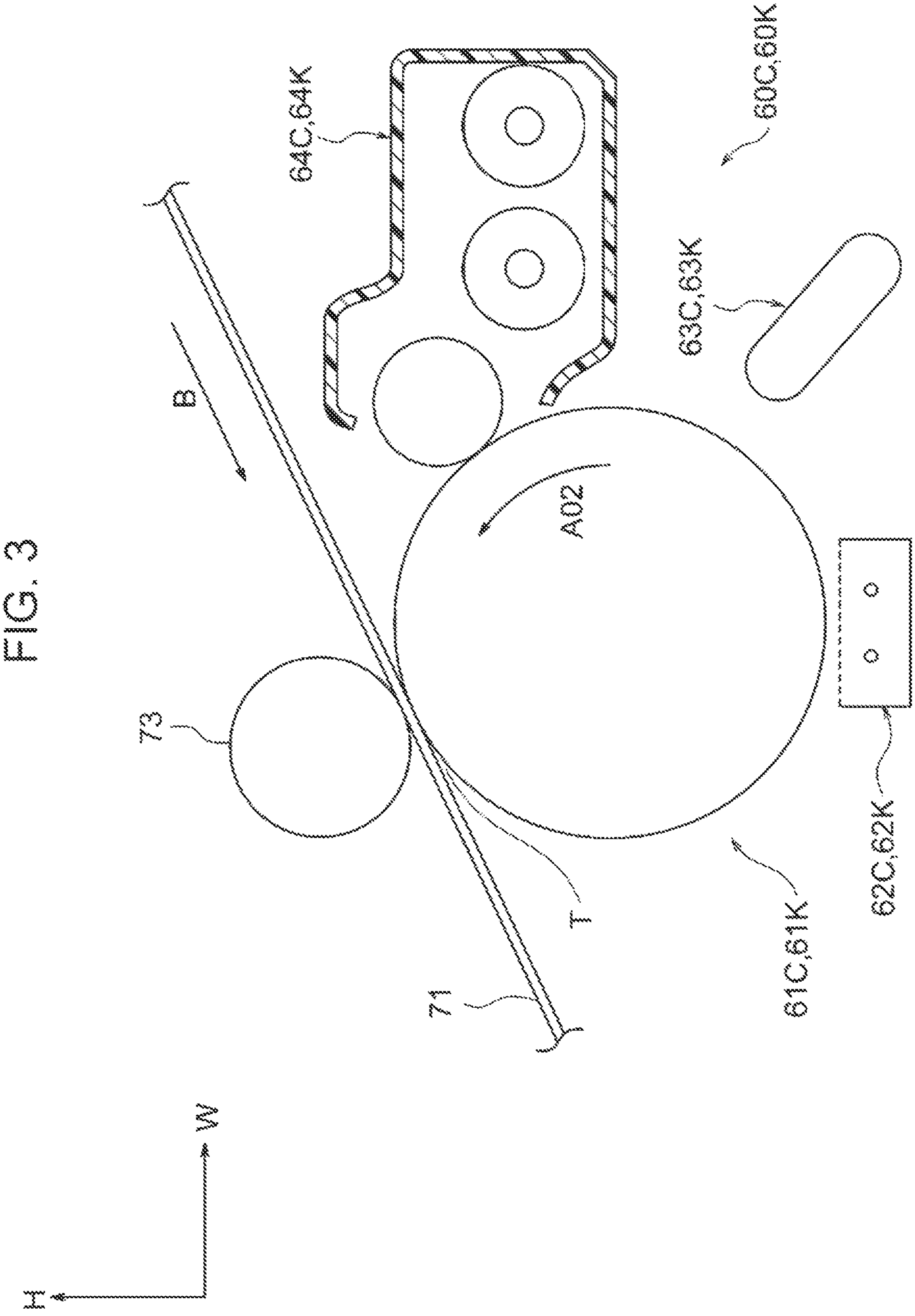
FIG. 3 schematically shows the configuration of another toner-image forming unit according to the first exemplary embodiment of the present disclosure.

As shown in FIGS. 1 and 2, the toner-image forming units 60Y and 60M are arranged side-by-side along a horizontal portion of a transfer belt 71 provided in the transfer device 70. As shown in FIGS. 1 and 3, the toner-image forming units 60C and 60K are arranged side-by-side along an inclined portion of the transfer belt 71 provided in the transfer device 70.

As shown in FIG. 2, the toner-image forming units 60Y and 60M include photosensitive members 61Y and 61M that rotate in the arrow A01 direction in FIG. 2 and that are in contact with the transfer belt 71, and charging devices 62Y and 62M that charge the photosensitive members 61Y and 61M. The photoconductors 61 are an example of an image carrier.

The toner-image forming units 60Y and 60M also include exposure devices 63Y and 63M that expose the photoconductors 61Y and 61M charged by the charging devices 62Y and 62M to form electrostatic latent images, and developing devices 64Y and 64M that develop the electrostatic latent images with toner to form toner images.

As shown in FIG. 3, the toner-image forming units 60C and 60K include photosensitive members 61C and 61K that rotate in the arrow A02 direction in FIG. 3 and that are in contact with the transfer belt 71, and charging devices 62C and 62K that charge the photosensitive members 61C and 61K. The toner-image forming units 60C and 60K include exposure devices 63C and 63K that expose the photoconductors 61C and 61K charged by the charging devices 62C and 62K to form electrostatic latent images, and developing devices 64C and 64K that develop the electrostatic latent images with toner to form toner images.

The charging devices 62Y, 62M, 62C, and 62K are scorotron charging devices and will be described in detail below.

Transfer Device

As shown in FIG. 1, the transfer device 70 includes the transfer belt 71, serving as an intermediate transfer body, multiple rollers 72, first-transfer rollers 73, a second-transfer roller 76, and a removal blade 78. The transfer device 70 is an example of a transfer unit.

The transfer belt 71 is an endless belt wound around the multiple rollers 72 so as to have an inverted triangular shape. The toner-image forming units 60Y and 60M are arranged side-by-side along the horizontal portion on the upper side of the transfer belt 71, and the toner-image forming units 60C and 60K are arranged side-by-side along the inclined portion on one side (right side in FIG. 1) of the transfer belt 71 in the width direction of the apparatus. The transfer belt 71 circulates in the arrow B direction when at least one of the multiple rollers 72 is rotationally driven.

In the following description, among the multiple rollers 72, a roller 72 disposed so as to push an inclined portion on the other side (left side in FIG. 1) of the transfer belt 71 outward in the width direction of the apparatus will be referred to as a roller 72*a*, and a roller 72 around which a portion of the transfer belt 71 on the other side in the width direction of the apparatus is wound will be referred to as a roller 72*b*.

As shown in FIGS. 2 and 3, the first-transfer roller 73 is disposed on the opposite side of the transfer belt 71 from the photoconductor 61 of each color. As shown in FIG. 1, the second-transfer roller 76 is disposed on the opposite side of the transfer belt 71 from the roller 72*a*.

With this configuration, the first-transfer rollers 73 transfer the toner images formed on the photoconductors 61 to the transfer belt 71 at first transfer positions T (see FIGS. 2 and 3) between the photoconductors 61 and the first-transfer rollers 73. Then, the second-transfer roller 76 transfers the toner images transferred to the transfer belt 71 to a sheet member P at a second transfer position NT between the transfer belt 71 and the second-transfer roller 76. The removal blade 78 scrapes off the residual toner and the like remaining on the transfer belt 71 from the transfer belt 71.

Fixing Device

As shown in FIG. 1, the fixing device 50 includes a heating roller 50*a* that rotates, and a pressure roller 50*b* that rotates in a manner driven by the heating roller 50*a*, nips a sheet member P with the heating roller 50*a*, and presses the sheet member P against the heating roller 50*a*.

With this configuration, the fixing device 50 applies heat and pressure to the sheet member P having a toner image transferred thereto to fix the toner image to the sheet member P. The sheet member P to which the toner image has been fixed is discharged to the outside of the housing 10*a* of the image forming apparatus 10.

Configuration of Relevant Part

Next, the charging devices 62Y, 62M, 62C, and 62K will be described. First, the charging devices 62Y and 62M will be described, and then the charging devices 62C and 62K will be described. Regarding the charging devices 62C and 62K, portions thereof different from those of the charging devices 62Y and 62M will be described.

Charging Devices 62Y and 62M

As shown in FIG. 2, the charging devices 62Y and 62M are disposed so as to face the photoconductor 61 and extend in the depth direction of the apparatus, which is parallel to the rotation axis of the photoconductor 61. The charging devices 62Y and 62M are attached to frames of the toner-image forming units 60Y and 60M, respectively, with brackets (not shown).

Figure 4A:
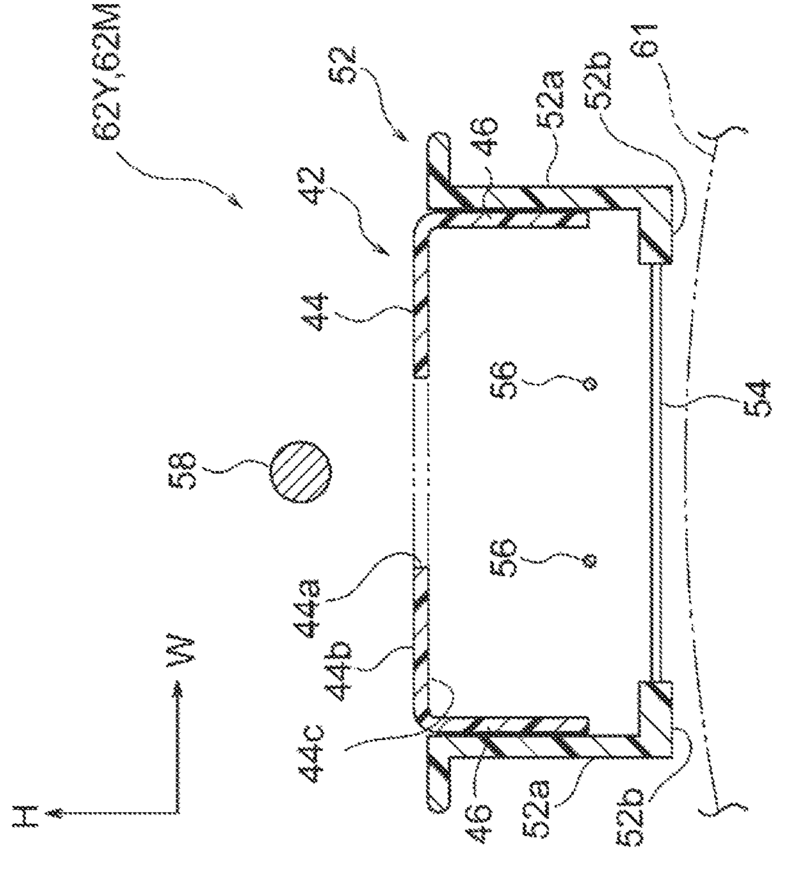
FIGS. 4A and 4B are sectional views of a charging device according to the first exemplary embodiment of the present disclosure, showing a state in which an opening faces downward.
Figure 4B:
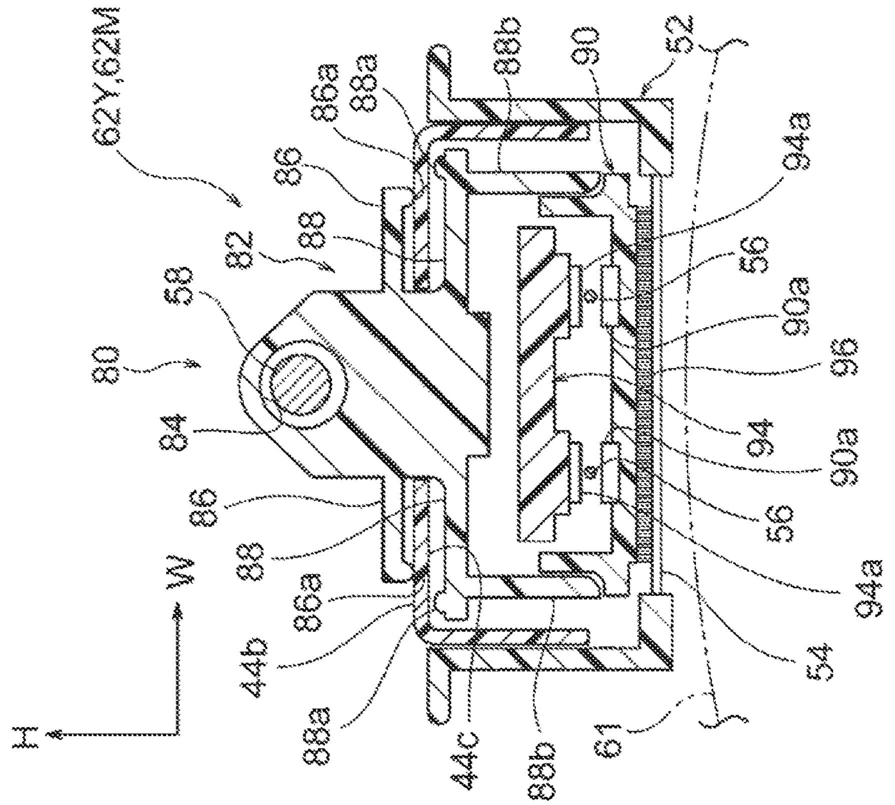

As shown in FIGS. 4A and 4B, the charging devices 62Y and 62M each include a shield housing 42 that is open on the side adjacent to the photoconductor 61 (see FIG. 2), a support 52, a grid electrode 54, two discharge wires 56, a lead shaft 58, and a cleaner 80. The shield housing 42 is an example of a housing, the lead shaft 58 is an example of a shaft member, and the discharge wires 56 are an example of a discharge electrode.

Shield Housing, Support, and Grid Electrode

As shown in FIG. 4A, the shield housing 42 has a U-shaped cross-section that is open on the side adjacent to the photoconductor 61, and includes a bottom plate 44, the thickness direction of which corresponds to the top-bottom direction of the apparatus, and a pair of side plates 46 connected to the ends of the bottom plate 44 and facing each other in the width direction of the apparatus. As described above, the charging devices 62Y and 62M are disposed such that the openings in the shield housings 42 face downward. Furthermore, a penetrating through-hole 44*a* is formed in the middle of the bottom plate 44 in the width direction, and the through-hole 44*a* extends in the depth direction of the apparatus.

The support 52 includes a pair of side plates 52*a* that hold the shield housing 42 therebetween in the width direction. The side plates 52*a* have extension portions 52*b* extending toward the opposing side plates 52*a* at portions adjacent to the photoconductor 61.

Grid Electrode and Discharge Wire

The grid electrode 54 has a plate-like shape and is disposed so as to face the surface of the photoconductor 61, as shown in FIG. 4A. The ends of the grid electrode 54 are attached to the pair of extension portions 52*b*.

The two discharge wires 56 are attached to a wire support member (not shown) attached to the shield housing 42 and extend in the depth direction inside the shield housing 42. Specifically, the two discharge wires 56 are arranged side-by-side in the width direction on the opposite side of the grid electrode 54 from the photoreceptor 61. The discharge wires 56 are indirectly attached to the shield housing 42.

With this configuration, the charging devices 62Y and 62M charge the photoconductors 61 by means of corona discharge generated by applying a high voltage to the discharge wires 56.

Lead Shaft

Figure 6:
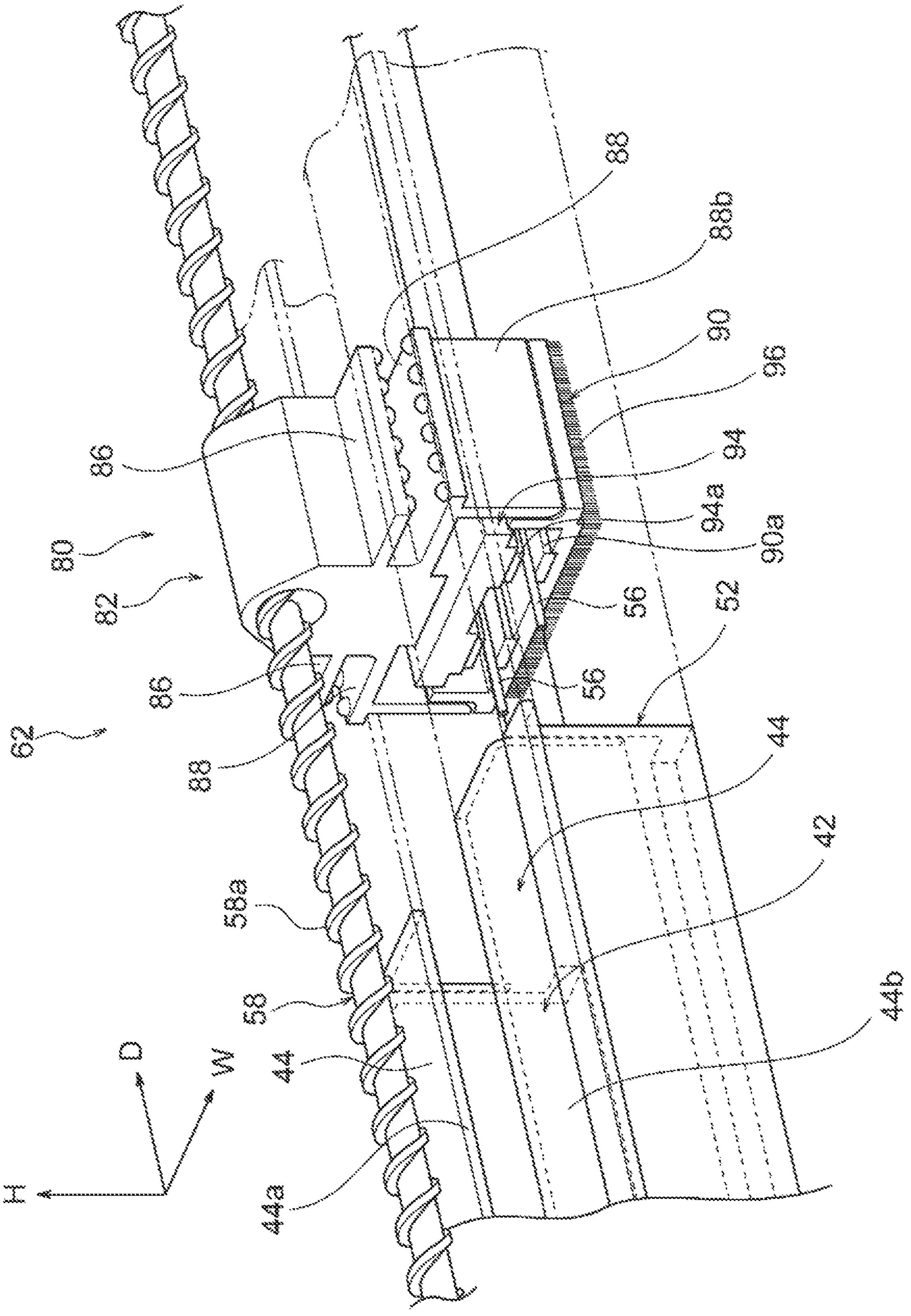
FIG. 6 is a perspective view of the charging device according to the first exemplary embodiment of the present disclosure.

The lead shaft 58 is disposed above the shield housing 42, as shown in FIG. 4A, and extends in the depth direction, as shown in FIG. 6. A male screw 58*a*, which is a spiral projection, is formed on the outer circumferential surface of the lead shaft 58.

Cleaner 80

As shown in FIGS. 4B and 6, the cleaner 80 includes a body 82 disposed through the through hole 44*a* in the shield housing 42, a base 90 attached to the body 82, and a rotation portion 94 attached to the base 90 in a rotatable manner. The cleaner 80 also includes a cleaning brush 96 attached to the base 90, at a portion adjacent to the grid electrode 54.

Body of Cleaner

As shown in FIG. 4B, the body 82 has a through hole 84, through which the lead shaft 58 passes, and a pair of extending portions 86, which extend so as to face an outward-facing surface 44*b* of the bottom plate 44 of the shield housing 42, at a portion thereof on the outer side of the shield housing 42 with respect to the portion passing through the through hole 44*b*.

Figure 8B:
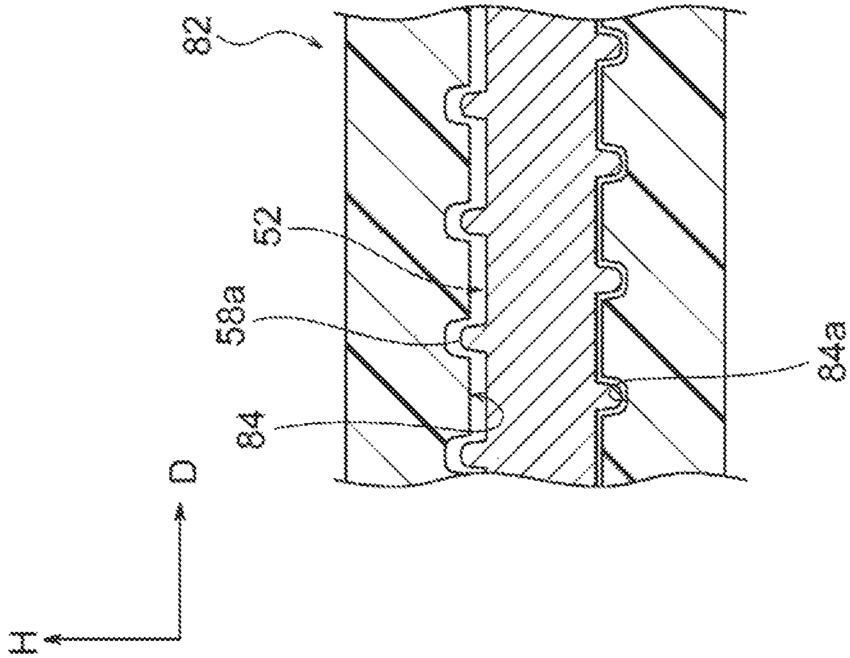
FIGS. 8A and 8B are sectional views of a lead shaft and a cleaner in the charging device according to the first exemplary embodiment of the present disclosure.
Figure 8A:
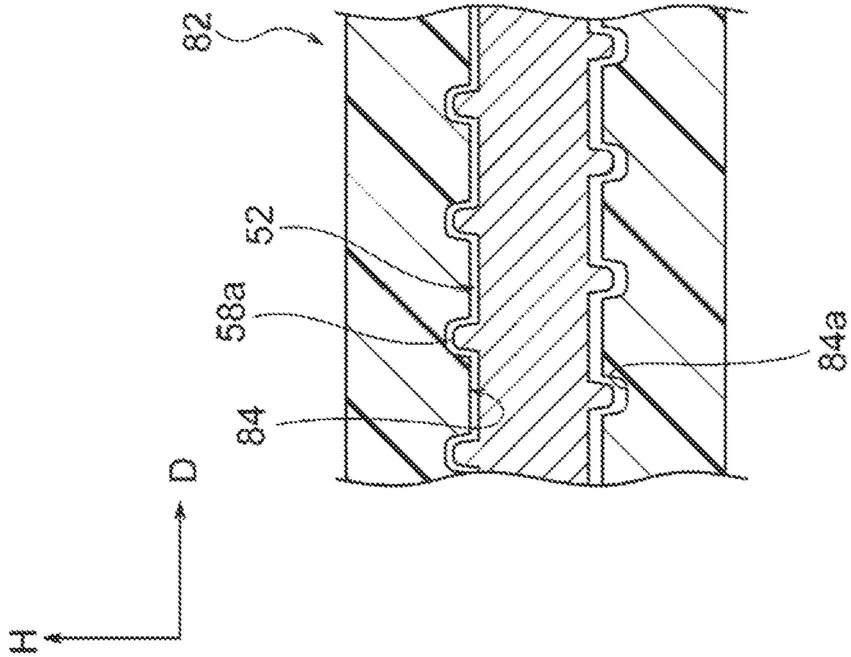

Furthermore, as shown in FIG. 8A, a female screw 84*a*, which is a spiral groove, is formed in the inner circumferential surface of the through hole 84 so as to mesh with the male screw 58*a* formed on the lead shaft 58.

Furthermore, as shown in FIG. 4B, the pair of extending portions 86 have, at the ends thereof, protrusions 86*a* protruding toward the outward-facing surface 44*b* of the bottom plate 44. In this exemplary embodiment, the protrusions 86*a* are hemispherical, and multiple pairs of protrusions 86*a* are provided in lines in the depth direction. The protrusions 86*a* are an example of a first protrusion.

The body 82 has a pair of extending portions 88, which extend so as to face an inward-facing surface 44*c* of the bottom plate 44 of the shield housing 42, at a portion thereof on the inner side of the shield housing 42 with respect to the portion passing through the through-hole 44*c*. The pair of extending portions 88 have, at the ends thereof, protrusions 88*a* protruding toward the inward-facing surface 44*c* of the bottom plate 44. In this exemplary embodiment, the protrusions 88*a* are hemispherical, and multiple pairs of protrusions 88*a* are provided in lines in the depth direction. The protrusions 88*a* are an example of a second protrusion.

Furthermore, the extending portions 88 have leg portions 88*b* extending downward from the extending portions 88.

Base of Cleaner, Rotation Portion, and Cleaning Brush

As shown in FIG. 4B, the base 90 of the cleaner 80 extends between the lower ends of the pair of leg portions 88*b* of the body 82 and is disposed between the grid electrode 54 and the discharge wires 56, when viewed in the depth direction. The base 90 includes a pair of cleaning pads 90*a* for cleaning the discharge wires 56.

Furthermore, the rotation portion 94 of the cleaner 80 is rotatably attached to the base 90 and is disposed on the opposite side of the discharge wires 56 from the base 90. The rotation portion 94 includes a pair of cleaning pads 94*a* for cleaning the discharge wires 56.

Furthermore, the cleaning brush 96 of the cleaner 80 is attached to the base 90, at a portion adjacent to the grid electrode 54, and the tip of the cleaning brush 96 is in contact with the grid electrode 54.

With this configuration, the protrusions 86*a* of the extending portions 86 come into contact with the outward-facing surface 44*b* of the bottom plate 44 due to the weight of the cleaner 80. Because the protrusions 86*a* are hemispherical, the extending portions 86 and the bottom plate 44 make point contact with each other, when viewed from the moving direction of the cleaner 80. When the protrusions 86*a* are in contact with the outward-facing surface 44*b* of the bottom plate 44, the protrusions 88*a* of the extending portions 88 are separated from the inward-facing surface 44*c* of the bottom plate 44. In this way, the cleaner 80 is positioned with respect to the shield housing 42. In other words, the cleaner 80 is positioned with respect to the discharge wires 56 and the grid electrode 54 attached directly or indirectly to the shield housing 42.

Figure 5:
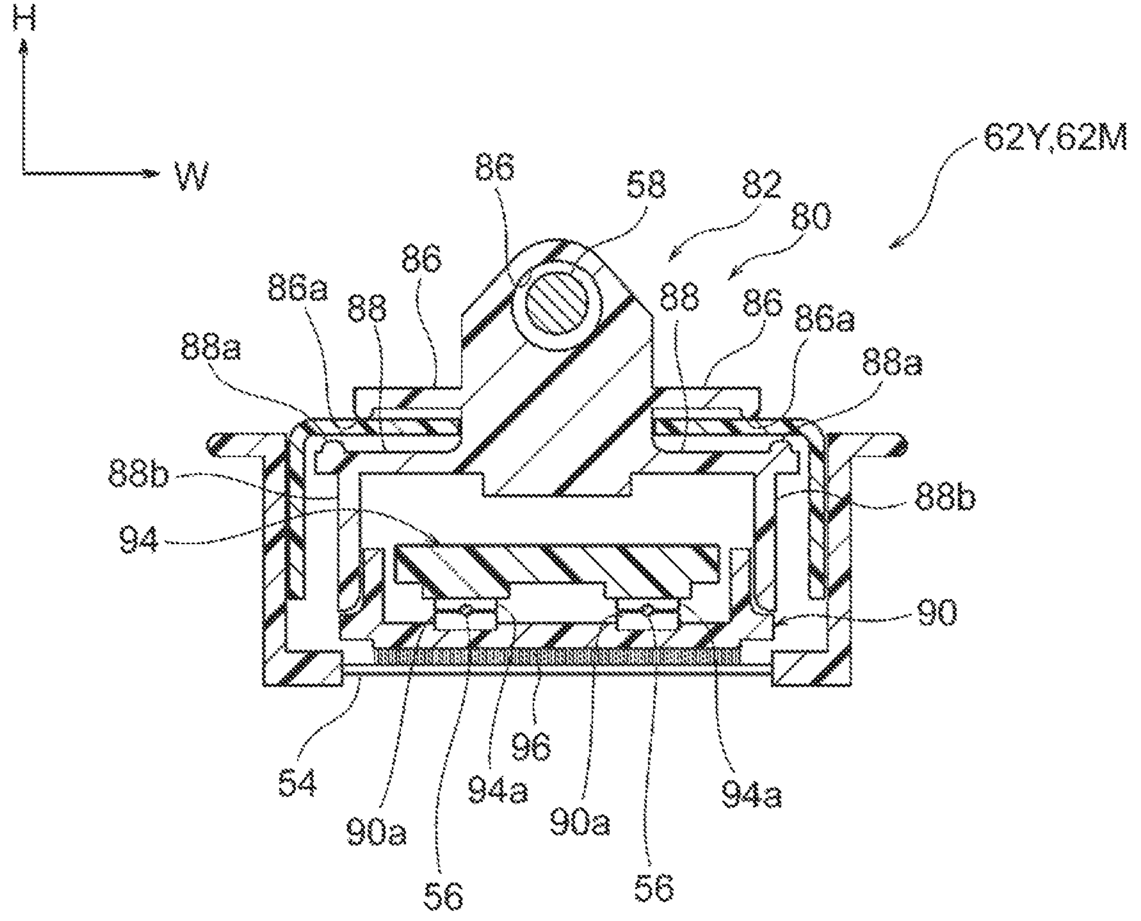
FIG. 5 is a sectional view of the charging device according to the first exemplary embodiment of the present disclosure, showing a cleaning state.

When the discharge wires 56 and the grid electrode 54 are cleaned with the cleaner 80, the rotation portion 94 is rotated by an urging member (not shown), so that the discharge wires 56 are sandwiched between the cleaning pads 90*a* and 94*a*, as shown in FIG. 5. As described above, the tip of the cleaning brush 96 is in contact with the grid electrode 54.

In a state in which the discharge wires 56 are sandwiched between the cleaning pads 90*a* and 94*a*, the apexes of the male screw 58*a* and the grooves of the female screw 84*a* are not in contact with each other in the radial direction of the lead shaft 58, as shown in FIG. 8A.

By rotating the lead shaft 58 in the circumferential direction, the cleaner 80 moves in the depth direction to clean the discharge wires 56 and the grid electrode 54.

Charging Devices 62C and 62K

Next, portions of the charging devices 62C and 62K different from those of the charging devices 62Y and 62M will be described.

Figure 7B:
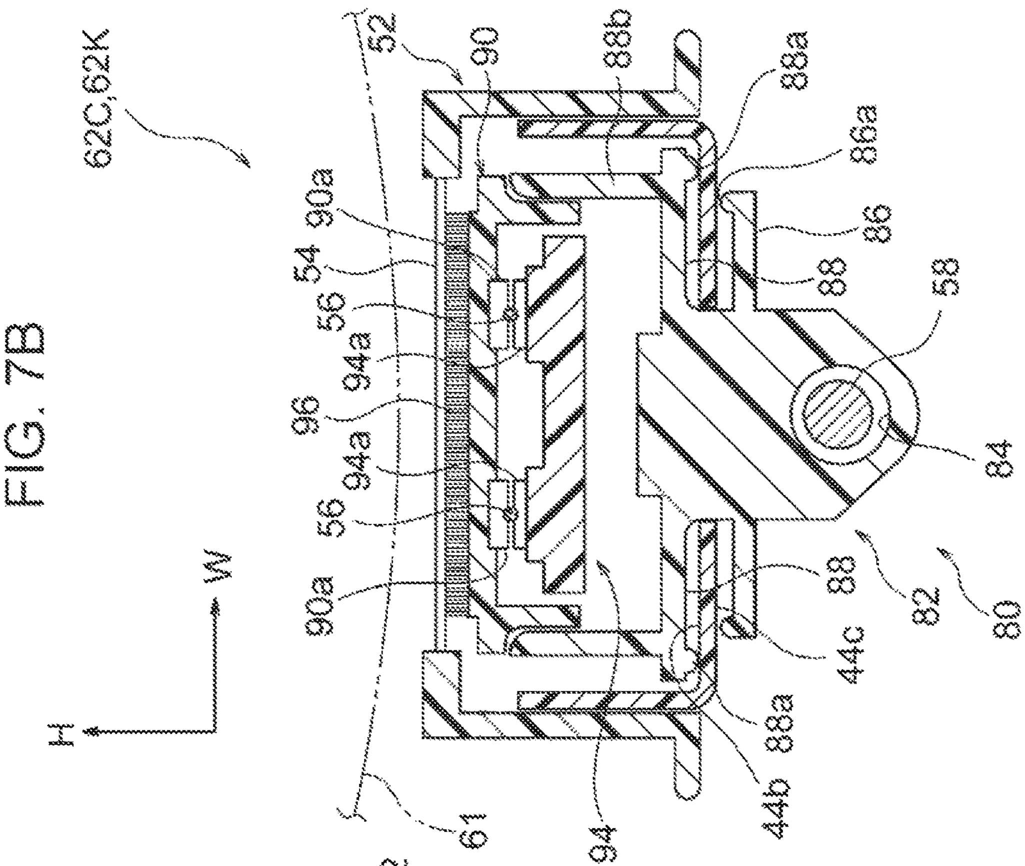
FIGS. 7A and 7B are sectional views of the charging device according to the first exemplary embodiment of the present disclosure, showing a state in which the opening faces upward.
Figure 7A:
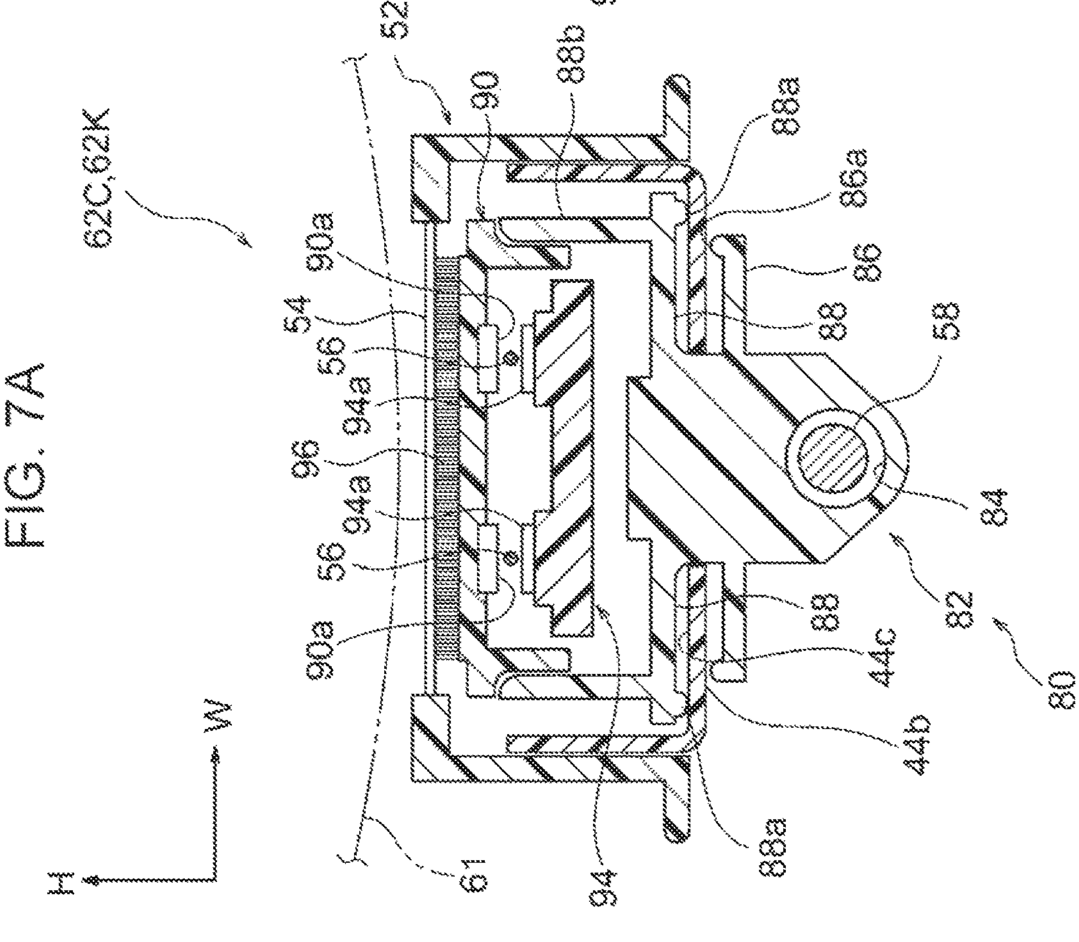

The charging devices 62C and 62K are disposed in orientations different from those of the charging devices 62Y and 62M. As shown in FIGS. 7A and 7B, the charging devices 62C and 62K are disposed such that the openings in the shield housings 42 face upward.

With this configuration, the protrusions 88*a* of the extending portions 88 come into contact with the inward-facing surface 44*c* of the bottom plate 44 due to the weight of the cleaner 80. Because the protrusions 88*a* are hemispherical, the extending portions 88 and the bottom plate 44 make point contact with each other, when viewed from the moving direction of the cleaner 80. When the protrusions 88*a* of the extending portions 88 are in contact with the inward-facing surface 44*c* of the bottom plate 44, the protrusions 86*a* of the extending portions 86 are separated from the outward-facing surface 44*b* of the bottom plate 44. In this way, the cleaner 80 is positioned with respect to the shield housing 42. In other words, the cleaner 80 is positioned with respect to the discharge wires 56 and the grid electrode 54 attached directly or indirectly to the shield housing 42.

In a state in which the discharge wires 56 are sandwiched between the cleaning pads 90*a* and 94*a*, the apexes of the male screw 58*a* and the grooves of the female screw 84*a* are not in contact with each other in the radial direction of the lead shaft 58, as shown in FIG. 8B.

In the charging device 62, the cleaner 80 has the protrusions 86*a* that come into contact with the outward-facing surface 44*b* of the bottom plate 44 in a state in which the opening in the shield housing 42 faces downward, and the protrusions 88*a* that come into contact with the inward-facing surface 44*c* of the bottom plate 44 in a state in which the opening in the shield housing 42 faces upward.

In the charging device 62, when the protrusions 86*a* are in contact with the outward-facing surface 44*b* of the bottom plate 44, the protrusions 88*a* are separated from the inward-facing surface 44*c* of the bottom plate 44. When the protrusions 88*a* are in contact with the inward-facing surface 44*c* of the bottom plate 44, the protrusions 86*a* are separated from the outward-facing surface 44*b* of the bottom plate 44.

In addition, in the charging device 62, the apexes of the male screw 58*a* and the grooves of the female screw 84*a* are not in contact with each other regardless of whether the protrusions 86*a* are in contact with the outward-facing surfaces 44*b* of the bottom plate 44 or the protrusions 88*a* are in contact with the inward-facing surface 44*c* of the bottom plate 44.

In the image forming apparatus 10, the charging devices 62Y and 62M of the toner-image forming units 60Y and 60M are disposed such that the openings in the shield housings 42 face downward, and the charging devices 62C and 62K of the toner-image forming units 60C and 60K are disposed such that the openings in the shield housings 42 face upward.

Second Exemplary Embodiment

Examples of a charging device, a toner-image forming unit, and an image forming apparatus according to a second exemplary embodiment of the present disclosure will be described with reference to FIGS. 9 and 10. In the second exemplary embodiment, portions different from those in the first exemplary embodiment will be described.

Figure 9B:
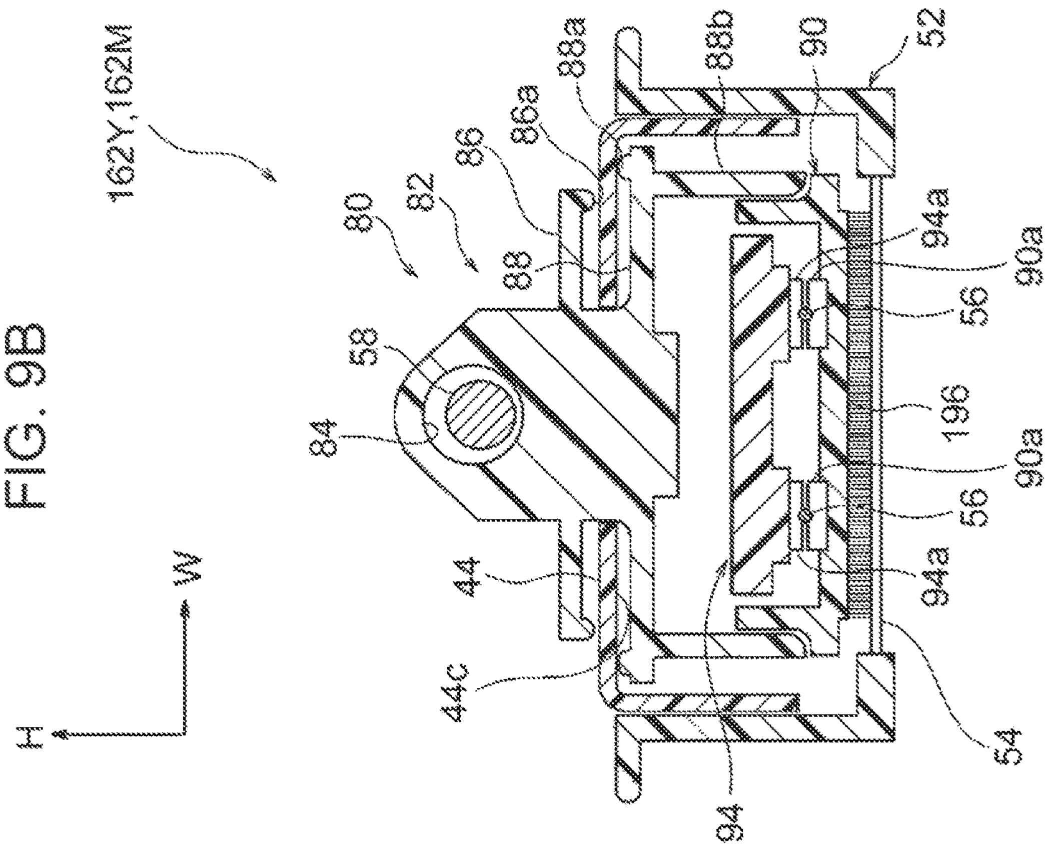
FIGS. 9A and 9B are sectional views of a charging device according to a second exemplary embodiment of the present disclosure, showing a state in which an opening faces downward.
Figure 9A:
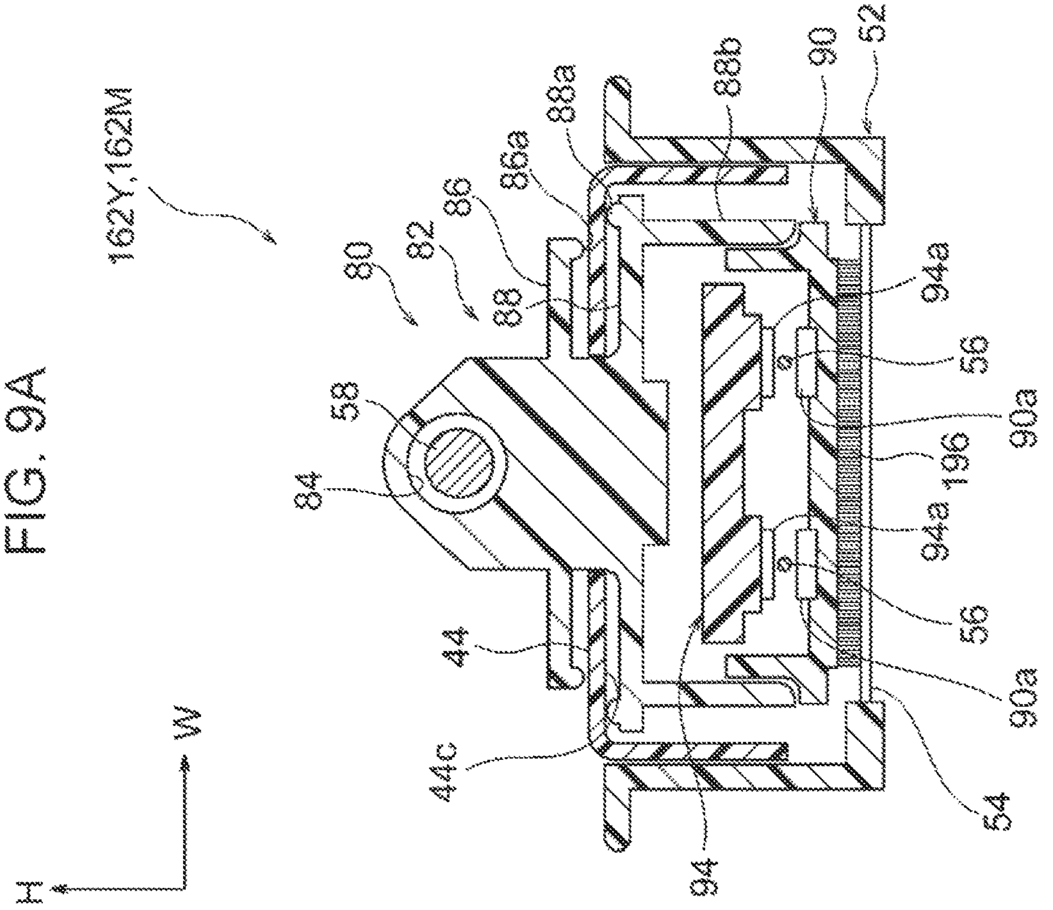

As shown in FIGS. 9A and 9B, in charging devices 162Y and 162M according to the second exemplary embodiment, also when the opening in the shield housing 42 faces downward, the protrusions 88*a* are in contact with the inward-facing surface 44*c* of the bottom plate 44 against the gravity of the cleaner 80.

Specifically, a cleaning brush 196 of the charging device 162, the cleaning brush 196 being elastically deformed and bent, is in contact with the grid electrode 54. The extending portions 88 of the cleaner 80 are urged toward the bottom plate 44 by the elastic return force of the cleaning brush 196, so that the protrusions 88*a* are in contact with the inward-facing surface 44*c* of the bottom plate 44. The cleaning brush 196 is an example of an urging member.

Figure 10B:
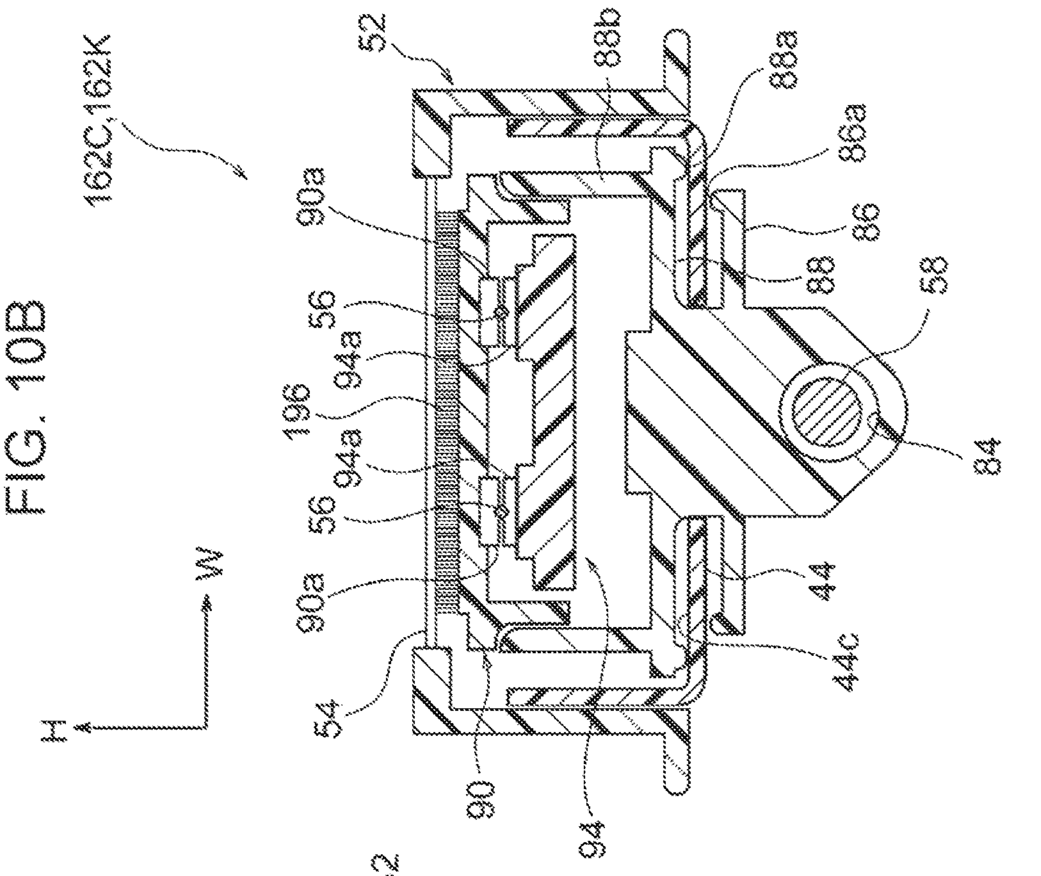
FIGS. 10A and 10B are sectional views of the charging device according to the second exemplary embodiment of the present disclosure, showing a state in which the opening faces upward.
Figure 10A:
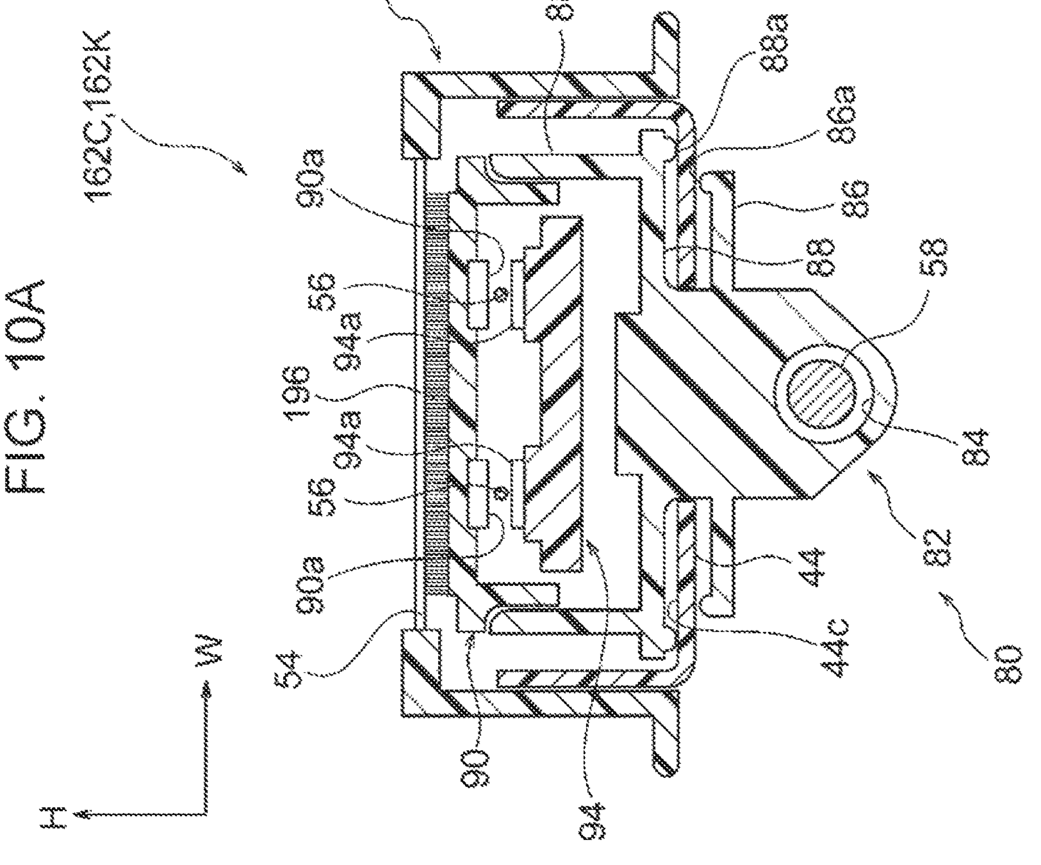

Meanwhile, as shown in FIGS. 10A and 10B, in the charging devices 162C and 162K, also when the opening in the shield housing 42 faces upward, the cleaner 80 is urged toward the bottom plate 44 by the elastic return force of the cleaning brush 196 and the gravity, so that the protrusions 88*a* are in contact with the inward-facing surface 44*c* of the bottom plate 44.

As described above, in the charging device 162, the elastically deformed cleaning brush 196 urges the extending portions 88 of the cleaner 80 toward the bottom plate 44 such that the protrusions 88*a* are in contact with the inward-facing surface 44*c* of the bottom plate 44. Hence, regardless of whether the opening in the shield housing 42 faces downward or upward, the protrusions 88*a* are in contact with the inward-facing surface 44*c* of the bottom plate 44.

Furthermore, in the charging device 162, the elastic force of the cleaning brush 196 urges the extending portions 88 of the cleaner 80 toward the bottom plate 44 such that the protrusions 88*a* are in contact with the inward-facing surface 44*c* of the bottom plate 44.

Although specific exemplary embodiments of the present disclosure have been described in detail above, the present disclosure is not limited to these embodiments, and it is apparent to those skilled in the art that various other embodiments are possible within the scope of the present disclosure. For example, although scorotron charging devices have been described as an example in the above-described exemplary embodiments, corotron charging devices may be used.

Although not particularly described in the above-described exemplary embodiments, it is only necessary that the cleaner 80 is positioned with respect to the shield housing 42 at least when the grid electrode 54 and the discharge wires 56 are cleaned by the cleaner 80.

Furthermore, in the above-described exemplary embodiments, although the protrusions 86*a* and 88*a* are formed in a hemispherical shape so that the protrusions 86*a* and 88*a* make point contact with the bottom plate 44 when viewed in the depth direction, which corresponds to the moving direction of the cleaner 80, the protrusions may be, for example, formed in a polygonal shape, such as a triangular shape, so that the protrusions make point contact with the bottom plate.

Furthermore, in the above-described exemplary embodiments, although the protrusions 86*a* and 88*a* are formed in a hemispherical shape so that the protrusions 86*a* and 88*a* make point contact with the bottom plate 44 when viewed in the moving direction of the cleaner 80, for example, the protrusions may extend in the moving direction of the cleaner 80.

Furthermore, in the second exemplary embodiment, although the cleaner 80 is urged such that the protrusions 88*a* are in contact with the inward-facing surface 44*c* of the bottom plate 44, regardless of the orientation of the opening in the shield housing 42, the cleaner 80 may be urged such that the protrusions 86*a* come into contact with the outward-facing surface 44*b* of the bottom plate 44, regardless of the orientation of the opening in the shield housing 42.

In the second exemplary embodiment, although the cleaner 80 is urged by the elastic force generated by the cleaning brush 196, the cleaner 80 may be urged by a magnetic force. In that case, however, the effect obtained by the urging with the elastic force is not obtained.

Furthermore, although the toner-image forming units 60 are disposed at the horizontal portion and the inclined portion of the transfer belt 71 in the above-described embodiments, all the toner-image forming units may be disposed at the horizontal portion of the transfer belt.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A charging device comprising: a housing having a U-shaped cross-section, disposed such that an opening thereof faces a surface of a rotating image carrier, and extending in an axial direction of the image carrier; a discharge electrode configured to charge the surface, the discharge electrode being attached to the housing, inside the housing, and extending in the axial direction; and a cleaner having a protrusion that comes into contact with a bottom plate of the housing and configured to move in the axial direction to clean the discharge electrode in a state in which the protrusion is in contact with the bottom plate, regardless of whether the opening in the housing faces upward or downward.

(((2)))

The charging device according to (((1))), wherein the protrusion of the cleaner includes a first protrusion that comes into contact with an outward-facing surface of the bottom plate in a state in which the opening in the housing faces downward, and a second protrusion that comes into contact with an inward-facing surface of the bottom plate in a state in which the opening in the housing faces upward.

(((3)))

The charging device according to (((2))), wherein the second protrusion is separated from the inward-facing surface when the first protrusion is in contact with the outward-facing surface, and the first protrusion is separated from the outward-facing surface when the second protrusion is in contact with the inward-facing surface.

(((4)))

The charging device according to (((3))), further comprising a shaft member extending in the axial direction and having a male screw on an outer circumferential surface thereof, wherein the cleaner has a through-hole through which the shaft member passes and which has, in an inner circumferential surface thereof, a female screw to be engaged with the male screw, the cleaner moves in the axial direction as the shaft member rotates in a circumferential direction, and apexes of the male screw and valleys of the female screw are not in contact with each other regardless of whether the first protrusion is in contact with the outward-facing surface or the second protrusion is in contact with the inward-facing surface.

(((5)))

The charging device according to (((1))), further comprising an urging member configured to urge the cleaner such that the protrusion is in contact with one surface of the bottom plate.

(((6)))

The charging device according to (((5))), wherein the urging member urges the cleaner with elastic force such that the protrusion is in contact with one surface of the bottom plate.

(((7)))

A toner-image forming unit including: an image carrier; the charging device according to any one of (((1))) to (((6))) that charges a surface of the image carrier; and a developing device that develops, as a toner image, an electrostatic latent image formed on the surface of the image carrier charged by the charging device.

(((8)))

An image forming apparatus including: the toner-image forming unit according to (((7))); and a transfer unit that transfers a toner image formed by the toner-image forming unit to a recording medium.

(((9)))

An image forming apparatus including: a plurality of toner-image forming units according to (((7))); and a transfer unit that transfers images formed by the toner-image forming units to a recording medium, wherein at least one of the toner-image forming units is arranged such that the opening in the housing of the charging device provided in the toner-image forming unit faces downward, and at least another one of the toner-image forming units is arranged such that the opening in the housing of the charging device provided in the toner-image forming unit faces upward.

What is claimed is:

1. A charging device comprising:

a housing having a U-shaped cross-section, disposed such that an opening thereof faces a surface of a rotating image carrier, and extending in an axial direction of the image carrier;

a discharge electrode configured to charge the surface, the discharge electrode being attached to the housing, inside the housing, and extending in the axial direction;

a grid electrode that has a plate-like shape and is disposed across the opening of the housing to face the surface of the rotating image carrier; and a cleaner having a protrusion that comes into contact with a bottom plate of the housing and configured to move in the axial direction to clean the discharge electrode in a state in which the protrusion is in contact with the bottom plate, regardless of whether the opening in the housing faces upward or downward, wherein:

the cleaner further includes a brush that comes into contact with and cleans the grid electrode when the cleaner cleans the discharge electrode in a state in which the protrusion is in contact with the bottom plate of the housing, and the protrusion is a plurality of physically separate protrusions provided in lines along a depth direction of the charging device.

2. The charging device according to claim 1, wherein the protrusion of the cleaner includes a first protrusion that comes into contact with an outward-facing surface of the bottom plate in a state in which the opening in the housing faces downward, and a second protrusion that comes into contact with an inward-facing surface of the bottom plate in a state in which the opening in the housing faces upward.

3. The charging device according to claim 2, wherein the second protrusion is separated from the inward-facing surface when the first protrusion is in contact with the outward-facing surface, and the first protrusion is separated from the outward-facing surface when the second protrusion is in contact with the inward-facing surface.

4. The charging device according to claim 3, further comprising a shaft member extending in the axial direction and having a male screw on an outer circumferential surface thereof, wherein:

the cleaner has a through-hole through which the shaft member passes and which has, in an inner circumferential surface thereof, a female screw to be engaged with the male screw, the cleaner moves in the axial direction as the shaft member rotates in a circumferential direction; and apexes of the male screw and grooves of the female screw are not in contact with each other regardless of whether the first protrusion is in contact with the outward-facing surface or the second protrusion is in contact with the inward-facing surface.

5. A toner-image forming unit comprising:

an image carrier;

the charging device according to claim 4 that charges a surface of the image carrier; and a developing device that develops, as a toner image, an electrostatic latent image formed on the surface of the image carrier charged by the charging device.

6. An image forming apparatus comprising:

the toner-image forming unit according to claim 5; and a transfer unit that transfers a toner image formed by the toner-image forming unit to a recording medium.

7. A toner-image forming unit comprising:

an image carrier;

the charging device according to claim 3 that charges a surface of the image carrier; and a developing device that develops, as a toner image, an electrostatic latent image formed on the surface of the image carrier charged by the charging device.

8. An image forming apparatus comprising:

the toner-image forming unit according to claim 7; and a transfer unit that transfers a toner image formed by the toner-image forming unit to a recording medium.

9. A toner-image forming unit comprising:

an image carrier;

the charging device according to claim 2 that charges a surface of the image carrier; and a developing device that develops, as a toner image, an electrostatic latent image formed on the surface of the image carrier charged by the charging device.

10. An image forming apparatus comprising:

the toner-image forming unit according to claim 9; and a transfer unit that transfers a toner image formed by the toner-image forming unit to a recording medium.

11. An image forming apparatus comprising:

a plurality of toner-image forming units according to claim 9; and a transfer unit that transfers images formed by the toner-image forming units to a recording medium, wherein at least one of the toner-image forming units is arranged such that the opening in the housing of the charging device provided in the toner-image forming unit faces downward, and at least another one of the toner-image forming units is arranged such that the opening in the housing of the charging device provided in the toner-image forming unit faces upward.

12. The charging device according to claim 1, further comprising an urging member configured to urge the cleaner such that the protrusion is in contact with one surface of the bottom plate.

13. The charging device according to claim 12, wherein the urging member urges the cleaner with elastic force such that the protrusion is in contact with one surface of the bottom plate.

14. A toner-image forming unit comprising:

an image carrier;

the charging device according to claim 13 that charges a surface of the image carrier; and a developing device that develops, as a toner image, an electrostatic latent image formed on the surface of the image carrier charged by the charging device.

15. An image forming apparatus comprising:

the toner-image forming unit according to claim 14; and a transfer unit that transfers a toner image formed by the toner-image forming unit to a recording medium.

16. A toner-image forming unit comprising:

an image carrier;

the charging device according to claim 12 that charges a surface of the image carrier; and a developing device that develops, as a toner image, an electrostatic latent image formed on the surface of the image carrier charged by the charging device.

17. An image forming apparatus comprising:

the toner-image forming unit according to claim 16; and a transfer unit that transfers a toner image formed by the toner-image forming unit to a recording medium.

18. A toner-image forming unit comprising:

an image carrier;

the charging device according to claim 1 that charges a surface of the image carrier; and a developing device that develops, as a toner image, an electrostatic latent image formed on the surface of the image carrier charged by the charging device.

19. An image forming apparatus comprising:

the toner-image forming unit according to claim 18; and a transfer unit that transfers a toner image formed by the toner-image forming unit to a recording medium.

20. An image forming apparatus comprising:

a plurality of toner-image forming units according to claim 18; and a transfer unit that transfers images formed by the toner-image forming units to a recording medium, wherein at least one of the toner-image forming units is arranged such that the opening in the housing of the charging device provided in the toner-image forming unit faces downward, and at least another one of the toner-image forming units is arranged such that the opening in the housing of the charging device provided in the toner-image forming unit faces upward.

* * * * *